United States Patent [19]

Boldebuck et al.

[11] 4,074,006
[45] Feb. 14, 1978

[54] POWDER COATABLE POLYESTER COMPOSITION AND ELECTRICAL CONDUCTOR COATED THEREWITH

[75] Inventors: Edith M. Boldebuck, Schenectady; Bernard Gorowitz, Clifton Park, both of N.Y.

[73] Assignee: General Electric Company, Schenectady, N.Y.

[21] Appl. No.: 751,045

[22] Filed: Dec. 16, 1976

[51] Int. Cl.² ............................................. C08G 63/76
[52] U.S. Cl. ................................. 428/379; 260/40 R; 427/120; 427/195
[58] Field of Search ............ 427/120, 195; 260/40 R; 428/379

[56] References Cited

U.S. PATENT DOCUMENTS

| 3,074,818 | 1/1963 | Lee | 427/120 |
| 3,205,192 | 9/1965 | Denson | 260/40 R |
| 3,296,335 | 1/1967 | Blaschke | 428/379 X |
| 3,925,297 | 12/1975 | Springling | 260/40 R X |
| 3,931,418 | 1/1976 | Risken | 428/379 X |
| 3,963,686 | 6/1976 | Katsimbas | 427/195 |

*Primary Examiner*—Sandra M. Person
*Attorney, Agent, or Firm*—Richard G. Jackson; Joseph T. Cohen; Jerome C. Squillaro

[57] ABSTRACT

Disclosed is a curable resinous coating composition which includes a polyester resin and a relatively small amount of a titanium-containing curing agent and optionally includes a surfactant and/or a powder free-flow agent. The composition is characterized with a suitable balance of cure rate and melt flow properties for powder coating and curing to form insulating films on magnet wire and other substrates.

18 Claims, No Drawings

POWDER COATABLE POLYESTER COMPOSITION AND ELECTRICAL CONDUCTOR COATED THEREWITH

This invention relates to a curable polyester resin composition, a coating powder formed of the composition, a coated conductor having a cured coating of the powder, and to a method for preparing the powder.

Insulated electrical conductors, e.g. insulated magnet wire, are made commercially by coating the conductors with solutions of heat curable resins and removing the solvents by volatilization during subsequent curing of the resins. Polyester resins suitable for forming insulation coatings on magnet wire are disclosed in U.S. Pat. No. 2,936,296 (Precopio et al.). These polyester resins include the product of reaction of terephthalic or isophthalic acid or their dialkyl esters, ethylene glycol, and a saturated aliphatic polyhydric alcohol having at least three hydroxyl groups. Solution coating methods for preparing insulated conductors have not been entirely satisfactory for reasons including high cost of the solvents, substantial energy requirements for volatilization of the solvents from the coatings, and problems involved in disposal of the volatilized solvents. Although powder formulations of the above-described polyester resins have been described in U.S. Pat. Nos. 3,205,192 (Denson) and 3,288,759 (Holub et al.), there remains a substantial need for improved solventless powder coating compositions which include these polyester resins and have a good balance of cure rate and melt flow properties.

U.S. Pat. No. 3,074,818 (Lee) discloses an aqueous dispersion of terephthalic and isophthalic polyester resins and alkanolamine titanate dialkyl esters as curing catalysts. The curing catalyst is disclosed to be present in an amount ranging from 1 percent to 8 percent by weight of the resin solids, which corresponds essentially to 0.1 to 0.8 part titanium per 100 parts of resin for the therein preferred curing catalyst - di(triethanolamine) diisopropyl titanate (80% solution of triethanolamine titanate in isopropyl alcohol). U.S. Pat. No. 3,382,203 (Rating et al.) discloses polyester-polyimide resins containing, per 100 parts of resin, 0.05-0.5 part of titanium chemically bound thereto by reacting various esters of titanic acid with the resins.

It has now been found by practice of the present invention that there is provided a resinous coating composition including a polyester resin and a relatively small amount of a titanium-containing curing agent and having a good balance of curing rate and melt flow properties. When the composition is coated as a substantially solvent-free powder on electrical conductors, such as magnet wire, and thereafter cured, the coatings are typically smooth, bubble-free, and continuous, i.e. substantially free of voids.

Generally stated, in one aspect the present invention is for a curable resinous coating composition including (I) a polyester resin comprising the reaction product of
   (a) from about 25 to 56 equivalent percent of a member selected from the class consisting of isophthalic acid, terephthalic acid, lower dialkyl ester of isophthalic acid, lower dialkyl ester of terephthalic acid, and mixtures thereof,
   (b) from about 15 to 46 equivalent percent of ethylene glycol, and
   (c) from about 13 to 44 equivalent percent of a saturated aliphatic polyhydric alcohol having at least 3 hydroxyl groups, e.g. glycerine, the sum of the equivalent percents being equal to 100 percent, and
(II) an organic ester of ortho-titanic acid in an amount corresponding to from about 0.02 to about 0.045 part by weight of titanium per 100 parts by weight of said resin.

Advantageously, the foregoing composition may further include either a surfactant or a powder free-flow agent (i.e., an agent for imparting free-flowing properties to powder) or both a surfactant and a powder free-flow agent. For simplicity, powder free-flow agents are referred to hereinafter as flow promoters.

Polyester resins which may be used in the present invention are described in detail in the aforesaid U.S. Pat. No. 2,936,296, which is incorporated herein by reference. Briefly, the polyester resins comprises the reaction product of (a) from about 25 to 56 equivalent percent, preferably from 36 to 50 equivalent percent, of a member selected from the class consisting of isophthalic acid, terephthalic acid, lower dialkyl ester of isophthalic acid, lower dialkyl ester of terephthalic acid, and mixtures thereof, (b) from about 15 to 46 equivalent percent, and preferably from 25 to 40 equivalent percent of ethylene glycol, and (c) from about 13 to 44 equivalent percent, and preferably from 20 to 32 equivalent percent, of a saturated aliphatic polyhydric alcohol having at least three hydroxyl groups. Typical of the isophthalic and terephthalic acid esters which may be used are those dialkyl esters containing in each alkyl group from one to eight, and preferably from one to four, carbon atoms including the dimethyl, diethyl, diisopropyl, dibutyl, etc. esters.

The terms "polyhydric alcohol" and "saturated aliphatic polyhydric alcohol having at least three hydroxyl groups" include both polyhydric alcohols in which the hydroxyl groups are connected by a plurality of carbon to carbon linkages, as well as other alcohols having three or more hydroxyl groups, such as glycerine, 1,1,1-trimethylol ethane, sorbitol, mannitol, diglycerol, trimethylol propanes, dipentaerythritol, etc.

The ethylene glycol can be replaced in whole or in part by other diols including but not limited to butane diol, neopentyl diol, pentane diol, etc. which will occur to those skilled in the art. The term "diol" is herein taken to mean such diols as well as mixtures thereof.

The term "equivalent percent" is employed in its usual sense herein, it being the number of equivalents of the reactant divided by the total number of equivalents of all reactants times 100. The number of equivalents of a reactant is the number of moles of the reactant multiplied by the number of functional groups such as carboxyl, ester, hydroxyl, etc. Thus, the equivalents of dimethyl terephthalate is the number of moles of this material multiplied by two; for glycerine, the number of moles times three; and for ethylene glycol, the number of moles times two.

The polyester resin preferred herein is prepared from the following ingredients in the indicated approximate amounts:

| | |
|---|---|
| Dimethyl terephthalate | 46 equivalent percent (3 moles) |
| Ethylene glycol | 31 equivalent percent (2 moles) |
| Glycerine (95%) | 23 equivalent percent (1 mole) |

The following method for preparing the polyester resin preferred herein is illustrative. The above materials are added along with xylene or a similar solvent, to prevent sublimation of the dimethyl terephthalate, to a 3-necked flask having a thermometer, stirrer and a Vigreux column with a Dean & Stark trap and funnel on the column. Throughout the reaction a nitrogen blanket is maintained on the system. The reaction mixture is heated for about 30 minutes, during which time the temperature of the mixture rises to about 130° C. and the xylene and any water present in the reactants azeotropically distill from the system. (Some water is commonly present in the polyhydric alcohol. U.S.P. glycerin, for example, contains about 5 percent by weight of dissolved water.) Then about 0.03 percent by weight of lead acetate as an alcoholysis catalyst based on the weight of the dimethyl terephthalate is added and heating continued for about 2 to 6 hours until the polyester has the desired molecular weight. Heating may be, for example, for about 3½ hours to a final temperature of about 240° C. Other alcoholysis catalysts can be used such as lead oxides, zinc oxide, cadmium acetate, cuprous acetate, zinc acetate, and the like. The reaction may be terminated by allowing the resin to cool to room temperature. Since this typically results in formation of a brittle solid mass, the resin is preferably removed from the reaction flask prior to cooling. The cooled resin may then be broken into small particles for subsequent use.

The organic ester of ortho-titanic acid included in the present curable resinous composition may be, for example, tetrakis (2-ethylhexyl) titanate, tetraoctylene glycol titanate, di(triethanolamine) diisopropyl titanate, or mixtures thereof. Tetrakis (2-ethylhexyl) titanate is sometimes referred to as tetraoctyl titanate and is commercially available from the Dupont Company as "TYZOR" TOT. Di(triethanolamine) diisopropyl titanate is available commercially as an 80% solution of triethanolamine titanate in isopropyl alcohol from the Dupont Company as "TYZOR" TE. Tetraoctylene glycol titanate is available commercially in nominally 100% active form as "TYZOR" OG Conc. from the Dupont Company. The organic ester of ortho-titanic acid, which may be a chelate as in the cases of tetraoctylene glycol titanate and triethanolamine titanate, is included in an amount corresponding to from about 0.02 to 0.045 part by weight of titanium per 100 parts by weight of the polyester resin component. Resinous compositions including the polyester component and the titanic acid ester component in amounts of less than 0.02 part of titanium per 100 parts of the polyester are found to cure at an unacceptably slow rate, typically resulting in coatings having poor thermal properties as evidenced by unacceptably low cut-through temperatures. When the titanic acid ester component is present in amounts more than about 0.045 part of titanium per 100 parts of the polyester resin, cured films of the composition typically have unacceptably high amounts of entrapped bubbles. Curing of the polyester resins is typically accompanied by formation of volatile by-products, which may be ethylene glycol. If curing proceeds too rapidly for the volatile by-products to escape from the resin, bubble entrapment results.

In many end uses, such as in coating magnet wire (wire for magnetic coils), it is generally necessary that the resinous composition flow out to a level film prior to cure or hardening thereof. If the minimum melt viscosity of the molten polyester resin composition in the temperature range at which resin fusing and curing are effected is too high, the composition typically entraps bubbles during cure and in some instances does not flow out to a level film. If the melt viscosity is too low, the molten resinous composition sags. Inclusion of the titanic acid ester component in the range of amounts given above generally increases the minimum melt viscosity of the resin to an extent which typically avoids sag of the molten resin and provides a good balance between cure rate and melt viscosity, resulting in desirable flow out and cure properties.

A surfactant component may advantageously be included in the curable resinous composition of the present invention. Powder compositions of the present invention including a surfactant typically exhibit improved wetting of substrates and flow out of the applied resin along the substrate, resulting in improved surface smoothness of the fused and cured resin films. In general, any suitable surfactant or mixture of surfactants may be included. Good results have been observed using small amounts of non-ionic fluorocarbon surfactants, especially non-ionic fluorinated alkyl ester surfactants such as Fluorad ® FC-430 and FC-431, which are commercially available from the 3M Company. The latter two surfactants have an added advantage in that they are soluble in organic solvents, e.g. methylene chloride, which are useful in preparing the present curable resinous compositions by the preparation method preferred herein. The surfactant component may be included in an amount up to about 1 part by weight per 100 parts by weight of the resin component, for example from about 0.10 to about 1 part by weight and preferably from about 0.25 to about 0.50 part by weight per 100 parts by weight of the resin component. In general, when the curable resinous compositions is to be applied as a powder to substrates such as magnet wire, it is critical that the surfactant component be included. Other surfactants which may prove suitable herein include non-ionic alkylarylpolyether alcohols, for example, the reaction products of octylphenol or nonylphenol with ethylene oxide, preferably prepared by reacting from about 40 to about 70 or more moles of ethylene oxide per mole of the alkylphenol.

The curable resinous compositions of this invention may be applied to a variety of substrates using a variety of coating techniques. Substrates, e.g. electrical conductors, of regular or irregular shape can be coated with the present compositions. Coating may be effected using powder spraying techniques employing electrostatic powder. A preferred use of the present compositions is for coating magnet wire using fluidized bed powder coating techniques, especially electrostatic fluidized bed coating techniques. Where it is desired to use the compositions in powder form in fluidized bed coating of magnet wire, the composition advantageously includes the otherwise optional flow promoter component. In general any suitable flow promoter or mixture of flow promoters may be included. The flow promoter may be finely divided silica, preferably fumed silica, and more preferably hydrophobic fumed silica. The resinous compositions of this invention in powder form are eminently suitable for continuously coating wire substrates employing fluidized bed coating techniques. The resins are especially useful in fluidized bed coating methods wherein wire substrates are coated by passing the wire through a cloud of electrostatically charged particles of the resins suspended above the upper surface of a fluidized bed of the resin powder contained within a coating chamber. Subsequent passage of the electrostatically coated wire to another chamber at temperatures elevated from that of the coating chamber wherein the resins are sintered, flowed, leveled and cured into uniform coatings essentially free of voids provides excellent insulated wire coatings. For electrostatic fluidized bed coating applications using the present resin composition in powder form, the resin advantageously includes up to about 0.5 part by weight, for example 0.025 to about 0.5 part by weight and preferably from about 0.05 to about 0.3 part by weight of flow promoter, per 100 parts by weight of the polyester resin component.

For preparing commercially attractive insulated magnet wire having suitable dielectric continuity using electrostatic fluidized bed application of the present powder resin compositions, it is critical that the flow promoter be present in an amount of about 0.5 part or less and preferably about 0.3 part or less, by weight, per 100 parts by weight of the polyester resin component. Too much flow promoter results in grainy cured coatings having unacceptably high surface roughness and insufficient dielectric continuity (flaws) for magnet wire applications. As shown in Example 6 below, attempted preparation of a magnet wire from the present composition with 0.7 part hydrophobic fumed silica included therein resulted in an unacceptable coating of the resin due to excessive number of flaws. Finely divided alumina may prove useful as a flow promoter herein.

The present resin powders may have any suitable particle size. When used for thin coatings, i.e. up to about 3 mils (e.g. from about 1 to 3 mils) in thickness, as in magnet wire applications, the present powders may have maximum particle diameters up to about 74 microns, preferably up to about 53 microns. In general, at least 50 percent by weight of the particles have diameters from about 12 to 74 microns and preferably from about 12 to about 53 microns.

The flow promoters may have any suitable surface area, for example from about 50 to about 350 or more square meters per gram as determined by nitrogen adsorption.

A preferred curable polyester resin composition for use herein includes a polyester resin consisting essentially of the reaction product of (a) about 46 equivalent percent of dimethyl terephthalate, (b) about 31 equivalent percent of ethylene glycol, and (c) about 23 equivalent percent of glycerine; tetrakis (2-ethylhexyl) titanate in an amount corresponding to from about 0.02 to about 0.045 part by weight of titanium per 100 parts by weight of the polyester resin; a non-ionic fluorinated alkyl ester surfactant in an amount from about 0.10 to about 1 part by weight per 100 parts by weight of the polyester resin; and hydrophobic fumed silica in an amount of from about 0.01 to about 0.3 parts by weight per 100 parts by weight of the polyester resin.

As used herein the term "sintering temperature range" means the lowest temperature in degrees Centigrade at which the solvent-free polyester resin powders adhere to themselves and to a substrate, but show no significant viscous flow or leveling. In general the sintering temperature range for solventless dry powder resins of the present invention is from about 65° to about 70° C. It is critical that the titanium curing agent component be uniformly dispersed throughout the polyester resin component. It is also critical that the polyester resin not be so increased in melt viscosity by incorporation therein of the titanium curing agent as to preclude flow out to a level film prior to completion of curing. It is found that the foregoing criteria are met by preparing the present curable resinous composition by spray drying under controlled conditions a solution of the resin and the titanium catalyst. In greater detail the curable resinous composition of the present invention is prepared as next described. The resin and the titanium catalyst are dissolved in a common solvent. Where used the surfactant component is preferably also dissolved in the common solvent, which may be a chlorinated organic solvent having a boiling point below the sintering temperature of the resin. A suitable solvent is methylene chloride (boiling point of 40° C). The solution is thereafter spray dried in a drying medium such as air and preferably nitrogen at a temperature above the boiling point of the solvent and below the sintering temperature of the resin, for example, at a temperature of from about 50° to 60° C. The spray dried resin particles are typically found to have the titanium catalyst component and, where used, the surfactant component dispersed substantially uniformly throughout. In general, drying is continued until the spray dried particles are substantially solvent-free, i.e. the particles have a solvent content of less than about 1.4 and preferably less than about 1% by weight based on the weight of the resin. The particles may then be fragmented, e.g. ball milled to increase the yield of particles within the desired size range set out above. Where used, the flow promoter may thereafter be blended with the substantially solvent-free resin particles. Solutions having any suitable concentration of the polyester resin may be used in preparing the present compositions. Concentrations of the polyester resin in methylene chloride may be, for example, in the range from about 4% by weight to about 25% by weight of resin based on the weight of the methylene chloride.

The melt viscosity of molten resin compositions of this invention decreases with increasing temperature until a minimum melt viscosity is obtained. Thereafter, as the temperature is further increased curing accelerates and the melt viscosity increases as curing proceeds until the resinous composition attains a gelled state. With further heating, the composition cures to a flexible, substantially insoluble and infusible state. With the short residence time in wire curing towers operated with an increasing temperature profile characterized by a low temperature at the inlet end to effect flow out and leveling of the powder resin composition prior to substantial curing and a high temperature at the outlet end to effect completion of cure of the flowed and leveled resin, a good balance of cure rate and melt viscosity is especially important.

A convenient measure of cure rate is incipient gel time. As used herein, the term "incipient gel time" means the time required for the present resinous composition to cure to a physical state that immediately precedes a slightly rubbery stage. Incipient gel time of the resinous composition is measured as next described. A glass slide is placed on a hot plate which is maintained throughout the test at a preselected known temperature, e.g. 235° C, sufficient to melt the resinous composition. After the slide is preheated to the temperature of the hot plate, approximately 0.25 gram of the composition in powder form is deposited onto the slide. After a brief interval, usually about 10 to 30 seconds, the powder is converted to a molten layer and timing is begun. Thereafter, at intervals of approximately 5 seconds, a spatula having a flexible stainless steel blade 1.5 centimeters in width and 8 centimeters in length is held at an angle of 45° with respect to the slide, flexed against the molten resin using sufficient pressure to make contact between the resin and a 3 centimeter length of the blade, and lifted with a snapping action. Prior to reaching the incipient gel stage, a small number of resinous filaments will be lifted by the spatula. The elapsed time at which at least 25 fine resinous filaments of less than 20 microns in diameter are simultaneously lifted by the flat blade of the spatula is taken as the incipient gel time.

In general, the incipient gel time of the present polyester resin powder compositions is from about 80 to about 150 seconds and preferably from about 100 to about 135 seconds at a temperature of 235° C ± 5° C.

Melt flow ratio is a convenient measure of melt viscosity. As used herein the term "melt flow ratio" means the ratio $D_H : D_o$ where $D_o$ is the diameter in millimeters of a test pellet and $D_H$ is the average diameter in millimeters of the pellet after heating for 5 minutes under the conditions of the melt flow ratio test next described. An 80-milligram portion of the resinous composition in powder form is pressed into a cylindrical pellet approximately 9.53 millimeters in diameter and approximately 40 mils in thickness. The pellet is placed on a horizontally positioned preheated glass slide resting on a heated block maintained at a preselected temperature in the range of from about 150° C to about 300° C. Placement of the pellet is such that one of the circular faces of the pellet is in contact with the glass slide. After 5 minutes, during which time the pellet typically melts and flows out to a larger diameter, the slide is removed from the heated block and allowed to cool to room temperature. A sufficient number of diameters of the resulting pellet are measured (in millimeters to the nearest 0.1 millimeter) to provide a reliable average and the arithmetic average diameter ($D_H$) is calculated in millimeters. The melt flow ratio at the preselected temperature is then calculated by dividing $D_H$ by $D_o$. Additional melt flow ratios for the same composition are calculated for a number of temperatures at intervals of about 10° C over the temperature range of from about 150° C to about 250° C. A graph is made by plotting the various melt flow ratios against the corresponding test temperatures and drawing a line through the plotted data points. Typically, the melt flow ratio increases with increasing temperature until a maximum melt flow ratio is obtained and decreases with further increasing temperatures. The maximum melt flow ratio is determined by inspecting the graph.

In general, the maximum melt flow ratio of the present polyester resin powder composition is from about 1.15 : 1 to about 1.38 : 1 and preferably from about 1.19 : 1 to about 1.35 : 1 in a temperature range from about 150° C to about 250° C.

Practice of the present invention is further illustrated by the following non-limiting examples. All parts and percentages given throughout this description and the appended claims are by weight unless otherwise indicated.

EXAMPLE 1

To 500 parts of methylene chloride were added with stirring 0.25 part of tetrakis (2-ethylhexyl) titanate (TOT) (0.02 part of titanium), 0.25 part of Fluorad ® FC-430 non-ionic fluorinated alkylester surfactant (commerically available from the 3M Company), and 100 parts of a polyester resin prepared by reacting (a) 46 equivalent per cent of dimethyl terephthalate, (b) 31 equivalent per cent of ethylene glycol, and (c) sufficient glycerine containing about 5 per cent by weight water to provide 23 equivalent per cent of glycerine per se.

The reaction was carried out substantially as described above until the resulting polyester resin had an average molecular weight of about 1200, a viscosity at 140° C of about 1000 poise (melt flow ratio of about 1.075), sintering temperature of 65°-70° C, and a hydroxyl content of about 0.8 to 1.2 milliequivalents of -OH per gram of polyester.

Stirring was continued until the added ingredients were substantially uniformly dissolved throughout the methylene chloride. The resulting 20 per cent solution was filtered sequentially through glass wool and a pressure filter containing pads with 5 micron pores. The filtrate was spray dried in nitrogen at 50° to 60° C, thereby forming hollow, generally spherical modified polyester resin particles having the TOT and FC-430 surfactant dispersed substantially uniformly throughout the polyester resin. The particles were substantially solvent-free. The particles were fragmentized and reduced in size by ball milling with ceramic balls for 16 hours. Submicron fumed silica was added to the resulting milled resin powder in an amount of 0.1 part of silica per 100 parts of the resin powder and the ingredients were uniformly blended by tumbling for 3 hours. The silica-resin powder blend was sieved through a 270 mesh (53 micron) screen. The powder particles having maximum diameter of 53 microns were used in the coating operation next described. The thus-prepared powder composition has a maximum melt flow ratio of about 1.22 occurring at a temperature of about 215° C and an incipient gel time of about 115 seconds at about 235° C.

Circular copper wire having a diameter of 36 mils was coated with the silica-resin powder by electrostatic fluidized bed coating using the apparatus described and claimed in the copending application of Lupinski and Gorowitz, Ser. No. 733,236, filed Oct. 18, 1976, and assigned to the assignee hereof. The powder was added to the annular space between a vertical outer plastic cylinder having an inner diameter of 2 inches and a vertical plastic tube disposed coaxially with the cylinder and through a porous polyethylene plate at the bottom of the cylinder. The tube has an inside diameter of 0.20 inch and an outside diameter of about 0.312 inch. Six metal electrodes were horizontally mounted throughout the cylinder wall about 4 inches above the porous plate. The electrodes were uniformly spaced 60° apart and projected inwardly toward the tube near the top thereof with the pointed electrode tips spaced about one-half inch from the axis of the tube.

Dry nitrogen was passed upwardly through the porous plate at a rate of 1.5 standard cubic feet per hour (superficial gas velocity of about 0.02 feet per second) and the cylinder was vibrated. The resulting fluid bed had a uniform upper surface at a height of 4.5 inches above the plate (0.5 inch above the electrodes). The top of the tube was 0.5 inch above the fluid bed surface. The electrodes were energized by a negative D.C. potential of 8.25 kilovolts (kv).

The circular copper wire having a diameter of 36 mils was passed over a grounded pulley and upwardly through the center of the tube at a rate of 5 feet per minute. Two upward passes of the resulting powder coated wire were made through a twelve-foot vertical furnace which had a temperature profile ranging from a minimum of 170° C (inlet end) to 300° C (outlet end).

A smooth, substantially bubble-free continuous fused and cured film coating resulted on the copper wire.

The coating was found to have good uniformity of thickness of about 1.75 ± 0.25 mils and only 7 flaws per 100 feet as determined by a Model 105 D.C. Holiday detector (Elcometer Industries, Ltd., London, England) operated at 3 kilovolts.

EXAMPLE 2

The procedure of Example 1 was repeated except that the electrodes were disposed 3.5 inches above the porous plate and were energized at minus 7.5 kilovolts; the fumed silica was finely divided hydrophobic silica; and the silica-resin particles which passed a 400 mesh (37 microns) screen were used in the bed. The powder composition of this example has a maximum melt flow ratio of about 1.22 occurring at a temperature of about 215° C. and an incipient gel time of about 115 seconds at about 235° C. Circular copper wire having a diameter of 36 mils was passed through the coating apparatus at 7.5 feet per minute. Two passes of the powder coated wire were made through the furnace which had a temperature profile ranging from a minimum of 200° C. (inlet end) to 360° C. (outlet end).

The resulting fused and cured film coating was found to have good uniformity of thickness of about 1.25 ± 0.25 mils. The film coating was tested for pinholes using a wet sponge, 9-volt pinhole detector by Elcometer Industries, Ltd. and found to be substantially free of pinholes.

EXAMPLE 3

The procedure of Example 1 was repeated except that the electrodes were disposed 3.5 inches above the porous plate and energized at minus 10.5 kilovolts; the tetrakis (2-ethylhexyl) titanate was included in an amount of 0.5 part (0.045 part of titanium) per 100 parts of the polyester resin; the silica was finely divided hydrophobic fumed silica; and the silica-resin particles which passed a 400 mesh (37 micron) screen were used in the bed. The powder composition of this example has an incipient gel time of about 110 seconds at a temperature of 235° C. Two passes of the powder coated wire were made through the furnace which had a temperature profile ranging from a minimum of 170° C. (inlet end) to 300° C. (outlet end).

The resulting fused and cured film coating was found to have good uniformity of thickness of about 1 ± 0.25 mils. The film coating was tested for pinholes using a wet sponge, 9-volt detector by Elcometer Industries, Ltd. and found to be substantially free of pinholes.

EXAMPLE 4

The procedure of Example 1 was repeated except that the electrodes were disposed one inch below the porous plate and were energized at a negative D.C. potential of 16 kilovolts; the tetrakis (2-ethylhexyl) titanate was included in an amount of 0.5 part (0.045 part of titanium) per 100 parts of the polyester resin, the silica was finely divided hydrophobic fumed silica; and the silica-resin particles which passed a 400 mesh (37 micron) screen were used in the bed. The powder composition of this example has a maximum melt flow ratio of about 1.23 occurring at a temperature of about 190° C. and an incipient gel time of about 110 seconds at about 235° C. Circular copper wire having a diameter of 40.3 mils was passed through the coating apparatus at 3 feet per minute. Two passes of the powder coated wire were made through the furnace which had a temperature profile ranging from a minimum of 170° C. (inlet end) to 300° C. (outlet end).

A smooth bubble-free fused and cured film coating, 2.1 ± 0.25 mils in thickness resulted on the copper wire. The coating was found to have only about 8 flaws per 100 feet as determined by a Model 105 D.C. Holiday detector operated at 3 kilovolts. The dielectric strength was 7.5 kilovolts.

The insulated wires prepared in Examples 1-4 were furthur tested for mechanical and thermal properties to determine their suitability for use as magnet wire. The test results are shown in Table I below. The unilateral scrape, flexibility, cut-through temperature, and heat shock tests were carried out by the corresponding procedures therefor described in ASTM Standards, D-1676 - 75. In the heat aging tests, straight-length samples of the insulated wires were heated for 100 hours in an air circulating oven maintained at a temperature of 175° C. The insulated wire samples were then cooled to room temperature (about 20°-25° C.) and wound about a 3× mandrel, i.e. a mandrel having a diameter equal to 3 times the diameter of the insulated wire. The wound wire samples are examined for cracks in the coating under a magnification of 10. If no cracks are found, the insulated wire passes the heat aging test.

TABLE I

| Test | Ex. 1 | Ex. 2 | Ex. 3 | Ex. 4 |
|---|---|---|---|---|
| Unilateral scrape, grams | 825 | — | — | >2950[a] |
| Flexibility: | | | | |
| 25% + 1X | Pass | Pass | Pass | — |
| 25% + 2X | — | — | — | Pass |
| Heat aging, 100 hours, 175° C. + 3X | Pass | Pass | — | Pass |
| Cut-through temperature, ° C. | 290 | 250 | 310 | 320 |
| Heat shock, 155° C., 30 minutes | Pass 5X | Pass 3X | Pass 3X | Pass 5X |

[a]The symbol > means greater than

As shown by the data in Table I, the insulated wires of Examples 1-4 are eminently suitable for use as magnet wire.

EXAMPLE 5

The procedure of Example 1 was repeated except that the voltage was −9 kilovolts, the wire had a diameter of 35.8 mils, and 0.5 part of FC-430 was included. The furnace was operated at an inlet temperature of 170° C and an outlet temperature of 300° C. The resulting fused and cured film was smooth, bubble-free and substantially uniform in thickness (1.1-1.35 mils).

The following example illustrates the criticality of the amount of flow promoter in applications where films having good dielectric continuity are required.

EXAMPLE 6

The procedure of Example 1 was repeated except that the fumed silica was added in an amount of 0.7 part per 100 parts of the resin. The resulting fused and cured film coating of about 1.5-1.75 mils in thickness was grainy. The coating had a rough surface and more than about 50 flaws per 100 feet as detected in a flaw detection test at 3,000 volts. The coated wire was unsuitable for use as a magnet wire.

EXAMPLE 7

The procedure of Example 1 was repeated except that the tetrakis (2-ethylhexyl) titanate was included in an amount of 1.0 part (0.09 part of titanium) per 100 parts of the polyester resin.

The resulting fused and cured film contained numerous bubbles.

EXAMPLE 8

The procedure of Example 1 was repeated except that the tetrakis (2-ethylhexyl) titanate was included in an amount of 0.11 part (0.01 part of titanium) per 100 parts of the polyester resin.

The resulting fused and cured film had variable cut-through temperatures as low as 220° C, and accordingly was unsatisfactory for polyester type magnet wire applications.

EXAMPLE 9

The procedure of Example 1 was repeated except the surfactant was omitted. The resulting fused and cured film was replete with discontinuities, i.e., spots having little or no film coating on the wire. The discontinuously coated wire was unsuitable for magnet wire applications.

EXAMPLE 10

A silica-resin powder was prepared by the silica-resin powder preparation method set forth in Example 1 except that the silica was finely divided hydrophobic fumed silica. This powder was applied from an electrostatic powder spray gun to an electrically grounded copper conductor strip, 1.125 inches in width and about 0.125 inch in thickness, maintained at a distance of about 3 inches from the gun. The grid in the gun nozzle was maintained at a negative D.C. potential of 30 kilovolts for the first 2 minutes of coating and at 20 kilovolts for an additional 4 minutes. The thus-coated strip was heated in an oven maintained at 250° C for a period of about 30 minutes. The resulting cured film was about 2.0–2.5 mils in thickness, smooth, substantially bubble-free, and substantially free of pinholes as measured by the wet sponge, 9-volt pinhole detector. The cut-through temperature of the cured film was greater than 300° C.

EXAMPLE 11

The process of Example 10 was repeated except that the first coat of fused and partly cured resin was treated with a 10 per cent aqueous solution of GAFAC PE-510 antistat (GAF Corporation). The solution was applied as a thin film using a dampened paper tissue, and then dried thermally to evaporate the water. A second coat of the resin powder formulation was then applied electrostatically. After fusion and cure of the second coat, the total film thickness was 4.0–5.0 mils, free of entrapped bubbles, and substantially pin-hole free as measured by the wet sponge, 9-volt pinhole detector.

It is to be understood that the foregoing detailed description is given merely by way of illustration and that numerous modifications may be made thereto without departing from the spirit or scope of the present invention.

What is claimed is:

1. A curable resinous composition comprising
   (I) a polyester resin consisting essentially of the reaction product of (a) from about 25 to 56 equivalent per cent of a material selected from the class consisting of isophthalic acid, terephthalic acid, lower dialkyl ester of isophthalic acid, lower dialkyl ester of terephthalic acid, and mixtures thereof, (b) from about 15 to 46 equivalent per cent of a diol, and (c) from about 13 to 44 equivalent per cent of a saturated aliphatic polyhydric alcohol having at least three hydroxyl groups, the sum of said equivalent percents being equal to 100 per cent, and
   (II) an organic ester of ortho-titanic acid in an amount corresponding to from about 0.02 to about 0.045 part by weight of titanium per 100 parts by weight of said resin.

2. The composition of claim 1, further including a surfactant.

3. The composition of claim 2, wherein the surfactant is a non-ionic fluorocarbon surfactant.

4. The composition of claim 1, further including a flow promoter.

5. The composition of claim 4, wherein the flow promoter is fumed silica.

6. The composition of claim 5, wherein the fumed silica is hydrophobic fumed silica.

7. The composition of claim 1, wherein the organic ester of ortho-titanic acid is selected from the group consisting of tetrakis (2-ethylhexyl) titanate, tetraoctylene glycol titanate, and di(triethanolamine) diisopropyl titanate.

8. The composition of claim 1, wherein the polyester resin consists essentially of the reaction product of (a) from about 36 to 50 equivalent per cent of a material selected from the class consisting of isophthalic acid, terephthalic acid, lower dialkyl ester of isophthalic acid, lower dialkyl ester of terephthalic acid, and mixtures thereof, (b) from about 25 to 40 equivalent per cent of a diol and (c) from about 20 to 32 equivalent per cent of a saturated aliphatic polyhydric alcohol having at least three hydroxyl groups.

9. The composition of claim 1, wherein
   (I) the polyester resin consists essentially of the reaction product of (a) about 46 equivalent per cent of dimethyl terephthalate, (b) about 31 equivalent per cent of ethylene glycol, and (c) about 23 equivalent per cent of glycerine;
   (II) the organic ester of ortho-titanic acid is tetrakis (2-ethylhexyl) titanate in an amount corresponding to from about 0.02 to about 0.045 part by weight of titanium per 100 parts by weight of said resin; and further including
   (III) a non-ionic fluorinated alkyl ester surfactant in an amount from about 0.10 to about 1 part by weight per 100 parts by weight of said resin; and
   (IV) a hydrophobic fumed silica in an amount of from about 0.01 to about 0.3 part by weight per 100 parts by weight of said resin.

10. The composition of claim 9, wherein the resin has an average molecular weight of about 1200, a melt viscosity of about 1,000 poise at 140° C, and a sintering temperature in the range of from about 65° to about 70° C.

11. A substantially solvent-free dry powder comprising the composition of claim 1.

12. The powder of claim 11 having a maximum melt flow ratio of from about 1.15:1 to about 1.38:1 in a temperature range of from about 150° C to about 250° C and an incipient gel time of from about 80 to about 150 seconds at a temperature of 235° C.

13. A substantially solvent-free dry powder comprising the composition of claim 9.

14. A coated electrical conductor comprising a cured layer of the composition of claim 11 in firm adherence to the conductor.

15. A coated electrical conductor comprising a cured layer of the composition of claim 13 in firm adherence to the conductor.

16. The coated conductor of claim 15 wherein the cured layer has a thickness of up to about 3 mils and the cured layer is substantially free of bubbles.

17. A method of preparing a powder coating composition comprising the steps of
(A) forming a solution by dissolving (I) 100 parts by weight of a polyester resin consisting essentially of the reaction product of (a) from about 25 to 56 equivalent per cent of a material selected from the class consisting of isophthalic acid, terephthalic acid, lower dialkyl ester of isophthalic acid, lower dialkyl ester of terephthalic acid, and mixtures thereof, (b) from about 15 to 46 equivalent per cent of a diol and (c) from about 13 to 44 equivalent per cent of a saturated aliphatic polyhydric alcohol having at least three hydroxyl groups, the sum of said equivalent percents being equal to 100 per cent; (II) an organic ester of titanic acid in an amount corresponding to from about 0.02 to about 0.045 part by weight of titanium per 100 parts by weight of said resin; and (III) an effective amount of a surfactant in a chlorinated organic solvent having a boiling point below the sintering temperature of said resin;
(B) spray drying the solution in a drying medium at a temperature above the boiling point of the solvent and below the sintering temperature of the resin to form resin particles having said titanic acid ester and said surfactant dispersed substantially uniformly throughout, said particles having a solvent content of less than about 1 per cent by weight based on the weight of the resin; and
(C) blending the resin particles with a flow promoter in an amount up to about 0.5 part by weight per 100 parts by weight of said resin.

18. The method of claim 17, further including fragmentizing the particles after step (B) and prior to step (C).

* * * * *